3,169,984
PROCESS FOR THE PURIFICATION OF ACRYLONITRILE
Donald W. Neely, West Collingswood, N.J., and Robert R. Seiler, Winter Park, Fla., assignors to E. I. du Pont de Nemours and Company, Wilmington, Del., a corporation of Delaware
No Drawing. Filed Dec. 13, 1962, Ser. No. 244,301
5 Claims. (Cl. 260—465.3)

This invention relates to acrylonitrile. More particularly, it relates to a process for refining acrylonitrile.

In the chemical industry, many quite different methods are known for the synthesis of acrylonitrile. Since the starting materials and operating conditions for many of the syntheses are so different from other syntheses, and since none of the syntheses is entirely free of by-product formation, it is not surprising that unique procedures have been devised to purify the acrylonitrile produced by different methods of synthesis. The extent of purification required depends upon the intended use of the acrylonitrile. For the most part, however, the acrylonitrile must be in an especially high state of purity as, for example, is true of acrylonitrile which is utilized in the manufacture of fibers.

Among the newer syntheses which have been developed into practical processes for the manufacture of acrylonitrile is that based on the reaction of propylene with nitric oxide as described in United States Patent No. 2,736,739. In this process, the crude acrylonitrile obtained from the reactors is subjected to a preliminary distillation which substantially completely removes high boiling impurities and gives a stream of semirefined acrylonitrile which contains variable amounts of water up to saturation at the ambient storage temperature, acetone, 1,5-hexadine, hydrogen cyanide, and lesser amounts of benzene, toluene, and also trace amounts of other impurities which are detectable only by application of refined techniques of gas chromatography. The approximate nature of semirefined acrylonitrile is indicated below on two bases, viz. for a typical lot of semirefined material, and also in terms of a maximum concentration of each impurity likely to be encountered in normal operation:

|  | Typical | Maximum |
|---|---|---|
| Acetone_____percent (by weight)__ | 0.15 | 0.4 |
| Hexadiene-1,5_____percent__ | 0.05 | 0.35 |
| Benzene_____do____ | 0.20 | 0.3 |
| HCN_____p.p.m__ | 2000 | 5000 |
| Other minor impurities_____percent__ | 0.02 | 0.03 |
| Water_____do____ | 3.7 | 4.0 |
| Acrylonitrile_____do____ | 95.9 | (balance) |

The maximum concentrations of all impurities are unlikely to be encountered in any one lot of semirefined acrylonitrile, and occasionally the indicated maximum concentration for one or more components may be exceeded. On the other hand, additional intermediate purification of said acrylonitrile may have eliminated some of the impurities indicated as being typical, or may have reduced their concentration.

The minor or trace impurities usually are present in such small amounts that they are exceedingly difficult to separate and identify, although they can be detected. The trace impurities at low levels of concentration are of such a nature that they are considered unobjectionable in most uses of the acrylonitrile. Nevertheless, because such trace impurities may concentrate in recycle streams, thus forcing a continuous purging of recycled material, removal of the trace impurities as well as those present in higher concentrations, is desirable and perhaps even essential. Conventional methods of purification do not remove the trace impurities nor are they eliminated by precise fractionation. Obviously, a process which removes from semirefined acrylonitrile not only the more abundant impurities but also the potentially troublesome trace impurities represents a substantial advance in the art.

In accordance with the present invention, an improved process for purifying semirefined acrylonitrile synthesized by the reaction of propylene with nitric oxide is provided which comprises adding to said semirefined acrylonitrile water sufficient to dissolve up to 90% of said acrylonitrile at a temperature in the range from 10° to 70° C.; maintaining said solubility relationship while mixing said water and acrylonitrile vigorously, discontinuing the mixing, allowing the quiescent mixture to stratify by gravity into an upper layer and a lower layer, and removing said lower layer consisting of acrylonitrile and water; and thereafter distilling said lower layer by conventional procedures to recover the purified acrylonitrile.

The invention is illustrated in the following examples which, however, are not to be construed as limiting the invention in any manner except as it is limited in the appended claims.

*Example 1*

100 parts by volume of semirefined acrylonitrile and 600 parts by volume of water were thoroughly mixed at 55° C. in a closed vessel. After mixing was discontinued, the mixture quickly separated into an upper layer (16 parts by volume), predominantly acrylonitrile saturated with water, and a lower layer (687 parts by volume) of water saturated with acrylonitrile. The lower layer was drawn off and distilled in conventional equipment to give 70 parts by volume of purified acrylonitrile. The acrylonitrile thus obtained, when examined in a programmed temperature gas chromatograph apparatus, showed none of the peaks characteristic of major or minor impurities which were present in the semirefined acrylonitrile.

*Example 2*

A series of purifications was carried out as in Example 1 with the exception that the upper layer consisting of acrylonitrile, impurities, and water was returned for retreatment by combining said upper layer with the feed of semirefined acrylonitrile in the next water treatment. After a series of five such treatments, the upper layer from each treatment having been returned with the successive charge of semirefined acrylonitrile, the purified acrylonitrile was of excellent quality having approximately 2 p.p.m. of toluene as the only impurity detectable in the gas chromatographic analysis. A significant impurity break through, however, occurred after the next or sixth cycle.

Under the conditions employed in this example, the capacity of the upper layer to carry and retain the impurities was exceeded only after the fifth treatment cycle. A complete purge of the upper layer at this point, to remove the accumulated impurities from the purification system, would have represented about a 5% loss of acrylonitrile.

To avoid this loss of valuable material, the purged upper layer after the fifth treatment cycle was fractionally distilled, taking 90% of the acrylonitrile overhead and discarding the remainder which now represented a loss of approximately 0.5% of the acrylonitrile fed to the purification system. The overhead material again was suitable feed for the water treatment step as judged by the high quality of the acrylonitrile obtained therefrom.

Example 2 demonstrated the effectiveness of a recycle treatment and the economy resulting thereby. Although a batch counterflow treatment process is exemplified herein, the extraction treatment may be carried out in a continuous counterflow operation provided that suitable purges of process streams are made.

Use of a simple closed vessel equipped for vigorous mechanical agitation of the contents, layering out the mixture, and separate withdrawal of the resulting layers, has been illustrated in the above examples. However, other types of extraction equipment which provides for good liquid-liquid contact may be used. Such equipment includes packed columns and rotating disc extractors which are especially suitable for continuous counter-current flow processing of the feed streams, i.e., semirefined acrylonitrile plus recycled acrylonitrile (if any), and water.

The maximum ratio by volume of water to semirefined acrylonitrile in the extraction treatment is regulated in part by the solubility of acrylonitrile in water at the selected operating temperature, and in part by the requirement that at least 10% by volume of the acrylonitrile fed must remain undissolved after the extraction treatment. Said maximum ratio of the volume of water to the volume of acrylonitrile, therefore, will vary from about 11.5 at 10° to about 5.5 at 70° C., a surprisingly limited spread in view of the wide temperature limits over which the process may be operated.

The maximum ratio of water to acrylonitrile, as described above, need not always be employed. Because the layering out at a given temperature, after mixing semirefined acrylonitrile and water, takes place less quickly at relatively low ratios by volume of water to acrylonitrile, a ratio is chosen such that at least 50% of the acrylonitrile is dissolved. Thus, enough water will be used to dissolve from about 50 to about 90% of the acrylonitrile fed to the process.

Although the process of the instant invention is effective over the temperature range from 10° C. to 70° C., better results are obtained at temperatures above 40° C. and below the atmospheric boiling point of the water-acrylonitrile azeotrope. A preferred operating temperature is 55±5° C.

Distillation of the lower layer, consisting of water saturated with purified acrylonitrile, for recovery of substantially anhydrous highly purified acrylonitrile may be accomplished in a manner known to those skilled in the art. Although the distillation in itself is not novel, said distillation is an essential part of the present process for converting semirefined acrylonitrile, as defined herein, to substantially anhydrous, highly purified acrylonitrile.

The effectiveness of the present process for purifying semirefined acrylonitrile apparently is due to the exceptiionally favorable distribution of impurities, associated with acrylonitrile made from propylene and nitric oxide, between acrylonitrile essentially saturated with water (upper layer) and water essentially saturated with acrylonitrile (lower layer). As illustrated by the example above, the impurities surprisingly are retained exclusivly in the upper layer until the concentration of impurities reaches the breakthrough level, at or before which a purge of recycle process streams must be taken. While the instant invention is not to be limited in any way by the explanation for its effectiveness given above, such an explantion helps to rationalize the operation of the process and control thereof.

What is claimed is:

1. In the process for the preparation of acrylonitrile by the catalytic reaction of nitric oxide with propylene followed by the distillation of the crude reaction product to yield semirefined acrylonitrile, the improvement of intimately contacting, at a temperature of about from 10 to 70° C., said semirefined acrylonitrile with sufficient water to dissolve about from 50 to 90% of said acrylonitrile until at least about 50% of said acrylonitrile is dissolved, allowing the resulting mixture to stratify into an upper organic layer and a lower aqueous layer containing dissolved acrylonitrile, removing said lower aqueous layer and thereafter distilling said lower aqueous layer to recover purified acrylonitrile.

2. The process of claim 1 wherein the water treatment is carried out in continuous countercurrent manner.

3. The process of claim 1 wherein both the water treatment and the distillation of the aqueous solution of purified acrylonitrile are carried out continuously.

4. The process of claim 1 wherin a large proportion of the acrylonitrile in said upper layer is recovered by fractionally distilling said upper layer at atmospheric pressure until up to 90% of the acrylonitrile is taken overhead, condensing the overhead vapors, returning said distillate to a succeeding water treatment step, and discharging the still residue to waste.

5. The process of claim 1 wherein said water treatment is carried out at 55±5° C., and the ratio by volume of water to acrylonitrile is about 6.

References Cited in the file of this patent
UNITED STATES PATENTS 2,500,403     Davis et al. _____ Mar. 14, 1950
2,684,979     Wenner et al. _____ July 27, 1954